United States Patent [19]

Berkhan et al.

[11] Patent Number: 4,875,558

[45] Date of Patent: Oct. 24, 1989

[54] SAFETY BRAKE FOR ESCALATORS

[75] Inventors: Dietmar Berkhan, Neustadt; Martin Mehlert, Nienstaedt, both of Fed. Rep. of Germany

[73] Assignee: Otis Elevator Company, Farmington, Conn.

[21] Appl. No.: 324,078

[22] Filed: Mar. 16, 1989

[51] Int. Cl.⁴ ............................................. B60T 13/04
[52] U.S. Cl. ...................................... 188/171; 188/75; 188/265
[58] Field of Search ................ 188/170, 171, 74–76, 188/28, 56, 342, 82.1, 82.3, 82.4, 82.8, 135, 136, 153, 173, 166, 220.1, 231, 265, 216

[56] References Cited

U.S. PATENT DOCUMENTS

| | | | |
|---|---|---|---|
| 1,541,063 | 6/1925 | Norris | 188/75 |
| 2,491,850 | 12/1949 | Browning | 188/171 |
| 2,652,132 | 9/1953 | Browning | 188/75 |
| 2,693,866 | 11/1954 | Trombetta | 188/171 |
| 3,032,146 | 5/1962 | Szabo et al. | 188/75 X |
| 3,115,956 | 12/1963 | Trombetta | 188/171 |
| 3,651,899 | 3/1972 | Yoshii | 188/171 X |
| 4,023,655 | 5/1977 | Anzai et al. | 188/171 |
| 4,031,987 | 6/1977 | Webb | 188/171 X |
| 4,132,292 | 1/1979 | Dufresna | 188/171 |

Primary Examiner—Douglas C. Butler
Attorney, Agent, or Firm—William W. Jones

[57] ABSTRACT

A safety brake for stopping an escalator in the event of a malfunction or the like, includes a locking pawl to prevent disengagement of the brake until the latter is intentionally released. Over the locking pawl reach a reinforcement of the brake. The brake is released by energizing a solenoid which displaces the locking pawl to an inoperative position. Once the locking pawl is disabled, the brake shoes are released from engagement with the escalator drive shaft brake disk. Locking and release of the brake shoes are initiated by springs and solenoid.

12 Claims, 4 Drawing Sheets

SAFETY BRAKE FOR ESCALATORS

DESCRIPTION

1. Technical Field

This invention relates to a safety brake for an escalator drive assembly, and more particularly to an escalator drive safety brake which supplies greater braking force with a compact construction.

2. Background Art

Escalators and similar moving walkways are provided with emergency braking systems which are activated in emergency situations, such as when a step chain breaks, when something gets caught in the steps or handrail so as to endanger a passenger, or the like. These braking systems may also be used to stabilize the escalator or walkway when not in motion for extended periods of time, as for example when an escalator is used as a stairway.

Escalator brakes of the foregoing type can take any of a variety of forms. For example, caliper brakes, wedge brakes, and single and double block brakes have been used as safety or emergency brakes for escalators, elevators, or moving walkways. U.S. Pat. Nos. 1,566,485, granted Dec. 22, 1925 to Lautrup; 2,424,333, granted July 22, 1947 to Santini et al; 2,693,866, granted Nov. 9, 1954 to Trombetta; 3,017,963, granted Jan. 23, 1962 to Landschulze; 3,074,517, granted Jan. 22, 1963 to Kohli; 3,158,233, granted Nov. 24, 1964 to Heberlain; 3,298,472, granted Jan. 17, 1967 to Jensen; and 4,023,655, granted May 17, 1977 to Angai et al, all disclose various brake mechanisms used in connection with elevators, escalators, hoists or the like.

Problems which exist with the prior art escalator brake assemblies include the need for large bulky assemblies when single or double block brakes are used in order to achieve the necessary braking forces. If a smaller brake assembly is needed, then wedge or caliper brakes are used, but these are undesirable because they impart asymmetrical forces to the brake shoe or shaft. Another disadvantage found in these brakes relates to the fact that the escalator must be run in reverse in order to disengage the brakes, once activated.

DISCLOSURE OF INVENTION

The emergency brake of this invention is a double block brake which provides for optimum braking torque without the need to use bulky brake components. With a low number of revolutions and tight installation space, very high braking torques can be reached. Smaller release devices can be used and the force on the brake levers is smaller than with conventional double block brakes. The brake is controlled by a solenoid which is energized when the escalator is running properly. When energized, the solenoid holds the brake control lever in a release position wherein the brake shoes are held out of engagement with the brake disk. The brake shoes are mounted on the brake levers via cam slots which serve to increase braking torque when the brakes are actuated. Thus the greater the rotational torque of the brake disk, which is mounted on the escalator drive shaft, the greater the reactionary braking torque of the brake shoes. The brake levers are biased toward a brake shoe-engaging position by an actuating spring, but the spring is counteracted by the solenoid when the latter is energized. In the event of an emergency, the power to the escalator motor, and to the solenoid, is interrupted whereby powered movement of the escalator stops. The emergency brake is then actuated to ensure that the escalator will not move under the influence of gravity. When the solenoid is deactivated, the brake actuating spring is able to pivot the brake levers to their actuated or locking positions. The brake shoes are then moved into engagement with the drive shaft brake disk to lock the drive shaft in position. The drive shaft thus engaged is preferably one of the step chains sprocket shafts, which when locked in place, halts movement of the step chains and of the step. The actuating spring also causes the control lever to pivot to an actuated position. The locking pawl moves over the control lever. As the brake disk moves in the way of the arrow, the brake shoes will move in the cam slots. If the brake levers are pushed apart, the control lever moves against the detent pawl and is locked. The self reinforcement of the system begins. There is no movement of the control, and the brake, lever possible and the angle of the cam slot is the enforcement angle. To control the maximum brake torque, the locking pawl is held by a stack of springs, so the force at the locking pawl and the maximum brake torque can be limited by the springs. When power is restored to the escalator, the solenoid is reactivated. Reactivation of the solenoid causes it to pivot the latching pawl to an inoperative position, and also causes it to pivot the control lever to the release position which compresses the actuating spring and pivots the brake levers to their release positions. Brake shoe springs move the brake shoes in the cam slots away from the brake disk whereby the drive shaft is freed up for further rotation.

It is therefore an object of this invention to provide an improved escalator emergency brake assembly which holds the escalator steps in position when power to the escalator is interrupted.

It is an additional object of this invention to provide a brake assembly of the character described which provides increased braking torque.

It is a further object of this invention to provide a brake assembly of the character described which includes a solenoid-operated control lever which actuates and deactuates the brake levers and shoes.

It is another object of this invention to provide a brake assembly of the character described wherein a latching pawl is operably connected to the solenoid for latching the control lever in place when the brake is actuated.

These and other objects and advantages of the invention will become more readily apparent from the following detailed description of a preferred embodiment thereof when taken in conjunction with the accompanying drawings, in which:

BEST MODE FOR CARRYING OUT THE INVENTION

Figure 1:
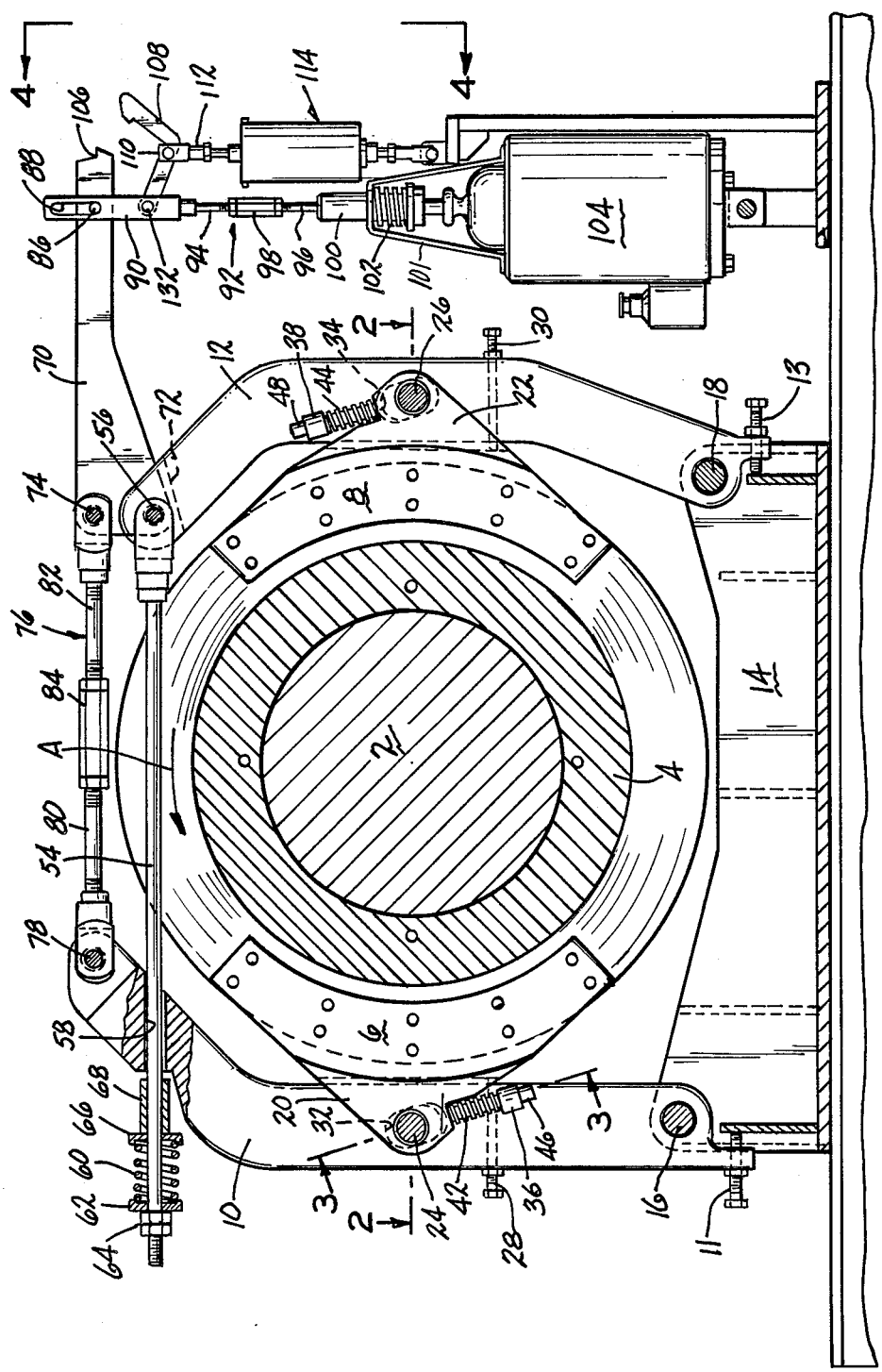
FIG. 1 is an elevational view of a preferred embodiment of the brake assembly of this invention taken in a plane which is perpendicular to the axis of rotation of the braked drive shaft of the escalator apparatus, the brake being shown in its nonactuated condition.

Referring now to FIG. 1, a preferred embodiment of the safety brake assembly of this invention is shown in its nonactuated condition. The escalator drive shaft to be braked is designated by the numeral 2. The drive shaft 2 has a brake disk 4 fixed thereto for engagement with a pair of brake shoes 6 and 8. The brake shoes 6 and 8 are mounted on brake shoe levers 10 and 12 respectively which in turn are pivotally mounted on a base 14 via pivot pins 16 and 18 respectively. The pivotal position of the levers 10 and 12 in their release position can be adjusted by means of stop screws 11 and 13 mounted in the levers 10 and 12 for adjustable engagement with the base 14. Each of the brake shoes 6 and 8 is formed with a forked portion 20 and 22 respectively which straddles the respective brake shoe levers 10 and 12 and receives a pivot pin 24 and 26. The brake shoes 6 and 8 can thus pivot with respect to the levers 10 and 12 about the pins 24 and 26. Adjustable stop pins 28 and 30 are threaded into the levers 10 and 12 and engage the brake shoes 6 and 8 to set the latters' position with respect to the levers 10 and 12. The pins 24 and 26 extend through elongated cam slots 32 and 34 in the levers 10 and 12 respectively. The slots 32 and 34 are elongated in a direction which is oblique to the vertical so that the brake shoes 6 and 8 can move obliquely toward and away from the brake disk 4. The relationship of the slots 32 and 34 shown in FIG. 1 is operable when the disk 4 and shaft 2 are rotating in the direction of the arrow A, as will be described in greater detail hereinafter.

Figure 3:
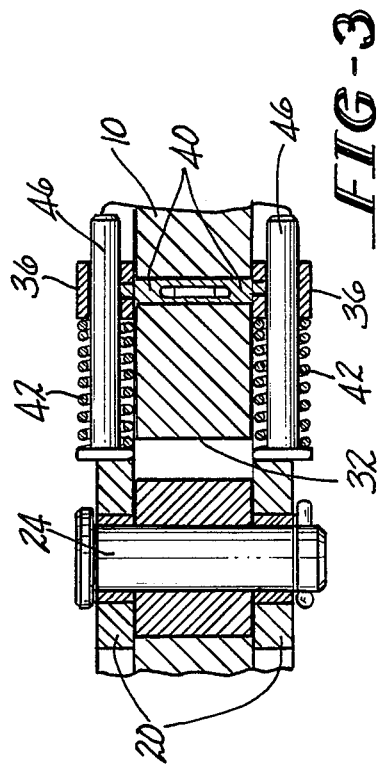
FIG. 3 is a sectional view taken along line 3—3 of FIG. 1.

As shown in FIGS. 1 and 3, collars 36 and 38 are fixed to the levers 10 and 12 by means of dowels 40 mounted in the levers 10 and 12 (see FIG. 3). Coil springs 42 and 44 are mounted on spring guides 46 and 48 which bear against forks 20 and 22 on the brake shoes 6 and 8 respectively. The coil springs 42 and 44 also bear against the collars 36 and 38 so as to bias the brake shoes 6 and 8 and pins 24 and 26 in the elongated cam slots 32 and 34, and away from the collars 36 and 38. The springs 42 and 44 thus serve as brake shoe release springs because they bias the brake shoes 6 and 8 away from the brake disk 4 due to the obliqueness of the elongated cam slots 32 and 34.

Figure 2:
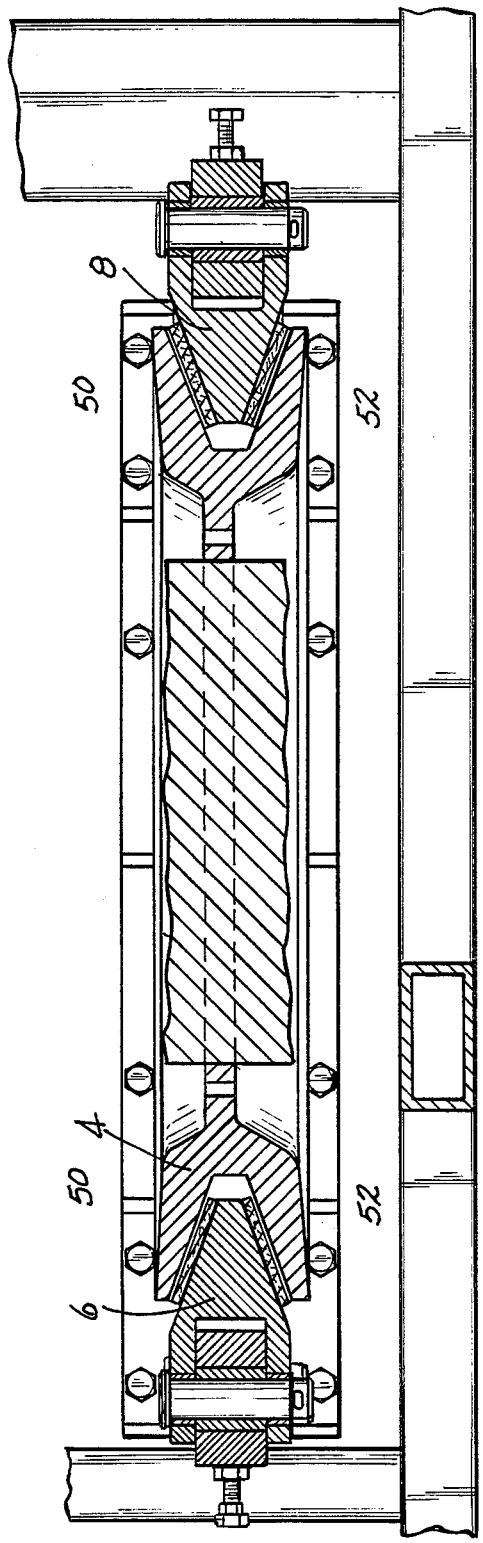
FIG. 2 is a sectional view taken along line 2—2 of FIG. 1.

Referring to FIG. 2 the preferred cross-sectional configuration of the brake shoes and brake disk is shown. The outer circumferential surface of the brake disk 4 is formed with a frusto-conical recess 50 which pads 52 on the brake shoes 6 and 8 engage when the brake is set. When the brake is not set, the pads 52 will be held away from the recess 50 by the springs 42 and 44.

Referring back to FIG. 1, the brake shoe levers 10 and 12 are interconnected by a connecting rod 54 which is pivoted about a pin 56 to the top end of the lever 12 and extends through a passage 58 in the top end of the lever 10. A coil spring 60 is mounted on the rod 54 and bears against one end plate 62 adjustably held on the rod 54 by a nut 64. The spring 60 also bears against another end plate 66 mounted on the rod 54 adjacent to a sleeve 68 which abuts the upper end of the lever 10.

Figure 4:
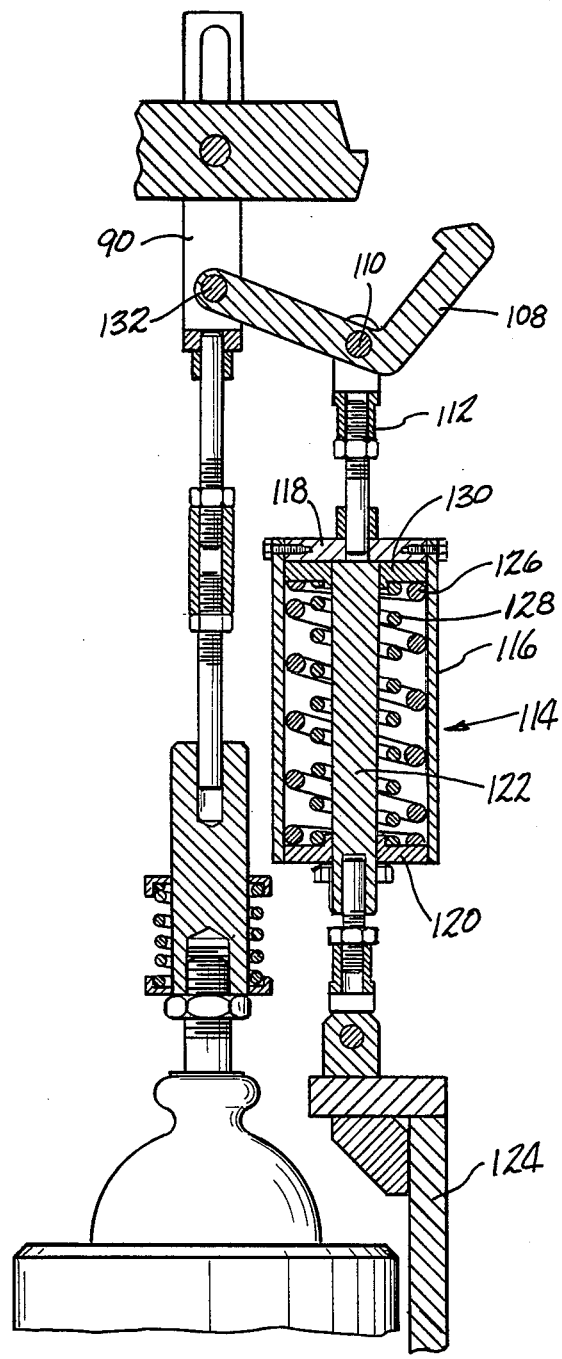
FIG. 4 is a sectional view taken along line 4—4 of FIG. 1.

A control arm 70 is pivotally mounted on the pin 56 and is positioned in a bifurcation 72 at the upper end of the lever 12. The control arm 70 is also pivotally mounted on a pin 74 to which a second connecting rod 76 is also journaled. The rod 76 is pivotally connected to the lever 10 via pin 78. The connecting rod 76 is formed from two end rods 80 and 82 connected together by a threaded collar 84, whereby the length of the rod 76 can be adjusted. The control arm 70 is provided with a laterally extending pin 86 which extends into a slot 88 in a sear 90. The sear 90 is mounted on an adjustable rod 92 having end portions 94 and 96 connected by a threaded adjustment collar 98. The rod 92 is in turn fitted into a base 100 which is spring biased downwardly by a coil spring 102 which engages a reaction bridge 101. The position of the sear 90 is controlled by a solenoid 104 which is energized by the electrical power used to operate the escalator. When the solenoid 104 is energized, the sear 90 will be in the extended position shown in FIG. 1 wherein the control arm pin 86 will be supported by the lower end of the elongated sear slot 88. The energized solenoid holds the sear 90 and the spring 102 in this extended position. The free end of the control arm 70 is formed with a notch 106. A latch pawl 108 is pivotally mounted on a pin 110 carried on a rod 112 that is supported by a stack of springs 114. As shown in FIG. 4, the stack of springs 114 is an annular housing 116 which has end walls 118 and 120, the latter of which slides on a post 122 secured to a pedestal 124. Return springs 126 and 128 are mounted inside of the housing 116 and bear against the end wall 120 and a plate 130 mounted on the post 122. The latch pawl 108 is also connected to the sear 90 by a pivot pin 132.

It will be appreciated that when the sear 90 is held in its extended position as shown in FIG. 1 by the solenoid 104, the control arm 70 is held in a brake-open position by reason of the pin 86 engaging the end wall of the sear slot 88. When the control arm 70 is held in the position shown in FIG. 1, the rod 76 is pushed to the left causing the lever 10 to be pivoted in the counterclockwise direction away from the brake disk 4. Likewise, the rod 54 is pulled to the right and the lever 12 is pivoted in the clockwise direction away from the brake disk 4. The tension of the rod 54 combined with the compression on the rod 76 causes the actuating spring 60 to be compressed. The compressed spring 60 thus biases the levers 10 and 12 toward the brake disk 4, but movement of the levers 10 and 12 is resisted by the seared control arm 70. At the same time, the seared control arm 70 holds the latch pawl in an inoperative pivotal position shown in FIG. 1.

Figure 5:
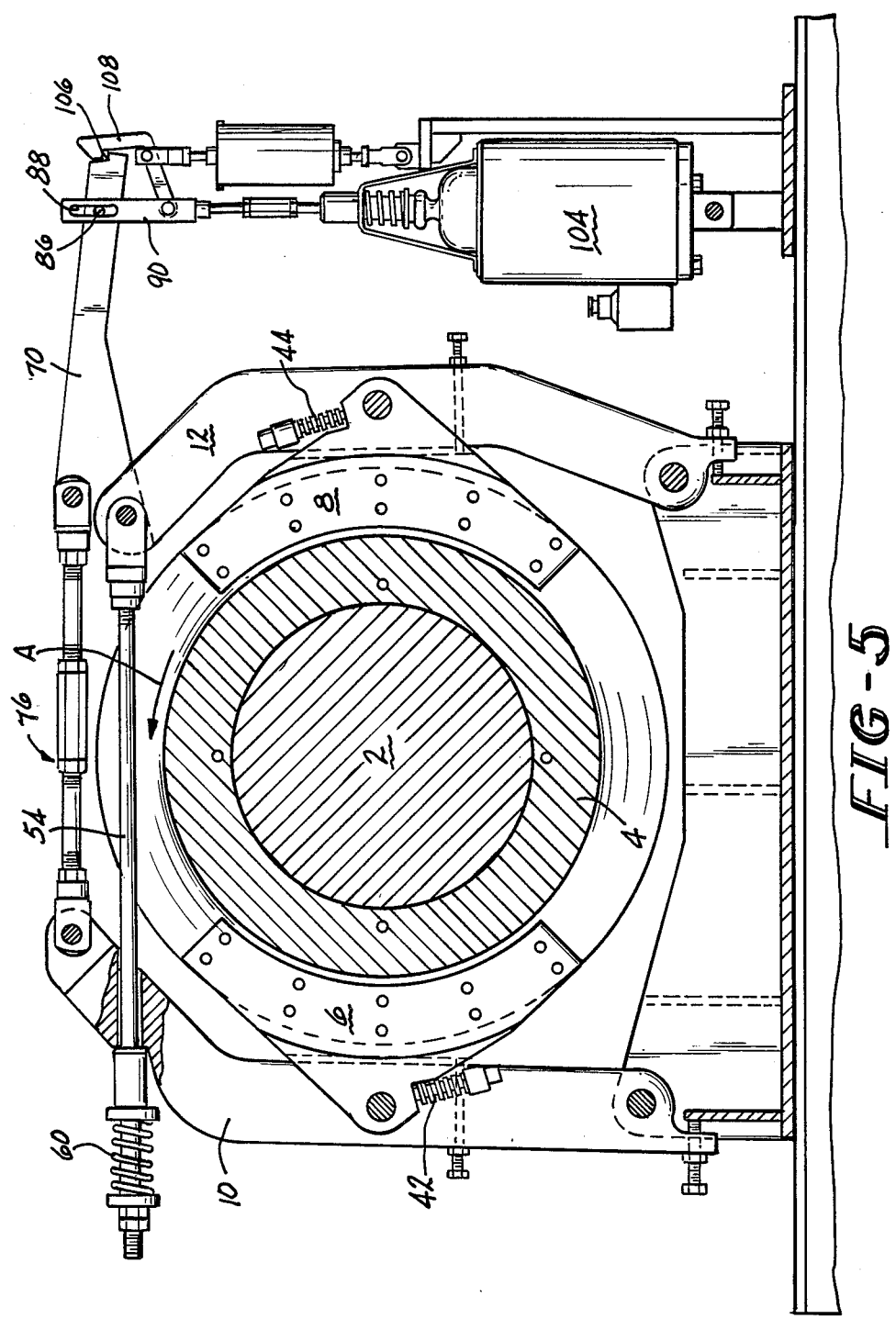
FIG. 5 is a view similar to FIG. 1 but showing the brake assembly in its actuated condition.

When power to the solenoid 104 is interrupted for any reason, the solenoid is deactivated and the sear 90 is downwardly displaced to the position shown in FIG. 5. The control arm pin 86 is thus left unsupported which frees up the control arm 70 for pivotal movement.

The actuating spring 60 is then allowed to pivot the control arm 70 to the position shown in FIG. 5 by pulling the rod 54 to the left and pushing the lever 10 and rod 76 to the right. Movement of the rod 54 to the left causes the lever 12 to pivot to the position shown in FIG. 5. The aforesaid pivotal movement of the levers 10 and 12 causes the brake shoes 6 and 8 to engage the brake disk 4. Once the disk 4 and shoes 6 and 8 engage, any subsequent rotation of the shaft 2 and brake disk 4, per arrow A, will tighten the shoes 6 and 8 against the disk 4 due to the angular positioning of the cam slots 32 and 34. As the brake shoes 6 and 8 tighten against the disk 4, the release springs 42 and 44 will be compressed. The retraction of the sear 90 pivots the pawl 108 to the position shown in FIG. 5 where it engages the notch 106 on the end of the control arm 70. The control arm 70 will thus be latched in the "brake-on" position.

When the solenoid 104 is reactivated, the sear 90 will return to its elevated position shown in FIG. 1. As the sear 90 rises, the pawl 108 will be pivoted away from the arm notch 106 before the pin 86 is contacted by the bottom of the sear slot 88. Thus the control arm 70 will be cleared for upward pivotal movement to its "brake off" position. This pivotal movement will pivot the levers 10 and 12 and compress the spring 60. When the levers 10 and 12 are pivoted sufficiently away from the brake disk 4, the springs 42 and 44 will be able to expand and push the brake shoes 6 and 8 away from the brake disk 4. Thus the escalator drive shaft 2 will be able to operate properly.

It will be appreciated that the brake assembly of this invention is capable of providing high torque, which is symmetrically applied to the brake disk and shaft in a compact mechanism. The mechanism also is readily and widely adjustable to provide a wide range of braking torques. The positive latch-release pawl also provides for improved and dependable performance of the mechanism. The brake additionally can be released without the need to run the escalator in reverse, as is necessary with most high torque prior art escalator safety brakes. It will be readily apparent that the power supply for the control solenoid can be interrupted by a jam sensor, or a velocity sensor, or can be dependent on the main power supply for the escalator motor.

Since many changes and variations of the disclosed embodiment of the invention may be made without departing from the invention concept, it is not intended to limit the invention otherwise than as required by the appended claims.

What is claimed is:

1. For use in controlling rotation of a shaft, a braking assembly of the type having a brake disk fixed to the shaft; brake shoes straddling the brake disk and mounted on respective brake levers; and a connecting rod and spring assembly interconnecting said brake levers for biasing said brake shoes toward said brake disk, the improvement comprising:
   (a) a control lever connected to each of said brake levers for controlling movement of said brake levers toward and away from said brake disk;
   (b) sear means for engaging said control lever to releasably hold the latter in a brake-off position wherein said brake shoes are held away from engagement with said brake disk;
   (c) spring means for biasing said sear means away from engagement with said control lever; and
   (d) actuator means operable to selectively resist said spring means to enable said sear means to retain said control lever in said brake-off position, whereby disabling of said actuator means enables said spring means to move said sear means out of engagement with said control lever to allow said brake shoes to engage said brake disk stopping rotation of the shaft.

2. The braking assembly of claim 1 wherein said actuator means is a solenoid which is powered by the same energy source rotating said shaft.

3. The braking assembly of claim 2 wherein said brake shoes are mounted on said brake arms by camming means operable to tighten said brake shoes against said brake disk responsive to rotational movement of said brake disk and shaft.

4. The braking assembly of claim 3 further comprising release spring means engaging said brake shoes and levers and operable to bias said brake shoes away from said brake disk.

5. The braking assembly of claim 4 further comprising movable pawl means on said sear means and operable to latch said control lever in a brake-on position when said solenoid is deenergized.

6. The braking assembly of claim 5 further comprising means for resiliently supporting said pawl means to absorb shock imparted thereto by reason of engagement with said control lever.

7. For use in controlling rotation of a shaft, a braking assembly of the type having a brake disk fixed to the shaft; brake shoes straddling the brake disk and mounted on respective brake levers; and a connecting rod and spring assembly interconnecting said brake levers for biasing said brake shoes toward said brake disk, the improvement comprising:
   (a) a control lever connected to each of said brake levers for controlling movement of said brake levers toward and away from said brake disk;
   (b) sear means for selectively engaging said control lever to releasably hold the latter in a brake-off position wherein said brake shoes are held away from engagement with said brake disk;
   (c) pawl means for selectively engaging said control lever to releasably hold the latter in a brake-on position wherein said brake shoes engage said brake disk; and
   (d) means for actuating said sear means and said pawl means to enable and disable each of said means from performing their respective functions.

8. The braking assembly of claim 7 wherein said pawl means is pivotally mounted on said sear means and is pivoted into engagement with said control lever as a result of concurrent movement of said sear means out of engagement with said control lever.

9. The braking assembly of claim 8 wherein said means for actuating is a solenoid and countering spring assembly connected to said sear means and operable to move the latter into and out of engagement with said control lever.

10. The braking assembly of claim 9 further comprising cushioning means for absorbing shocks imparted to said pawl when the latter engages said control lever.

11. The braking assembly of claim 10 wherein said brake shoes are mounted on said brake levers by camming means operable to tighten said brake shoes against said brake disk in response to rotation of said shaft.

12. The braking assembly of claim 11 wherein said cam means includes cam springs operable to bias said brake shoes away from said brake disk.

* * * * *